United States Patent [19]

Lutnick

[11] 4,257,503

[45] Mar. 24, 1981

[54] DISENGAGEMENT CONTROL FOR A TORQUE CONVERTER CLUTCH

[75] Inventor: Edward T. Lutnick, Flint, Mich.

[73] Assignee: General Motors Corporation, Detroit, Mich.

[21] Appl. No.: 7,022

[22] Filed: Jan. 29, 1979

[51] Int. Cl.³ ............................................. F16D 41/04
[52] U.S. Cl. .................. 192/3.23; 192/3.34; 192/4 A
[58] Field of Search ...................... 192/4 A, 3.23, 3.34

[56] References Cited

U.S. PATENT DOCUMENTS

| | | |
|---|---|---|
| 3,746,135 | 7/1973 | Ishikawa ............................. 192/4 A |
| 3,957,143 | 5/1976 | Barth .................................. 192/4 A |
| 4,088,208 | 5/1978 | Goode ................................ 192/4 A |
| 4,103,764 | 8/1978 | Iijima ................................. 192/4 A |

Primary Examiner—Kenneth Downey
Attorney, Agent, or Firm—Donald F. Scherer

[57] ABSTRACT

A control for a torque converter clutch has a solenoid valve for initiating engagement and disengagement of the clutch. A switch responsive to vehicle brake pedal movement is operable to complete an electrical circuit for the solenoid valve to initiate disengagement of the clutch prior to energization of the vehicle braking system.

4 Claims, 2 Drawing Figures

DISENGAGEMENT CONTROL FOR A TORQUE CONVERTER CLUTCH

This invention relates to torque converter clutch controls and more particularly to torque converter clutch controls which are responsive to the operator initiated actuation of the vehicle brakes.

It is an object of this invention to provide an improved control for a solenoid valve controlled torque converter clutch in a vehicle wherein a switch, connected to the vehicle brake pedal, is operative to control the solenoid valve for effecting clutch disengagement on initial movement of the brake pedal and prior to actuation of the vehicle brakes.

Figure 1:
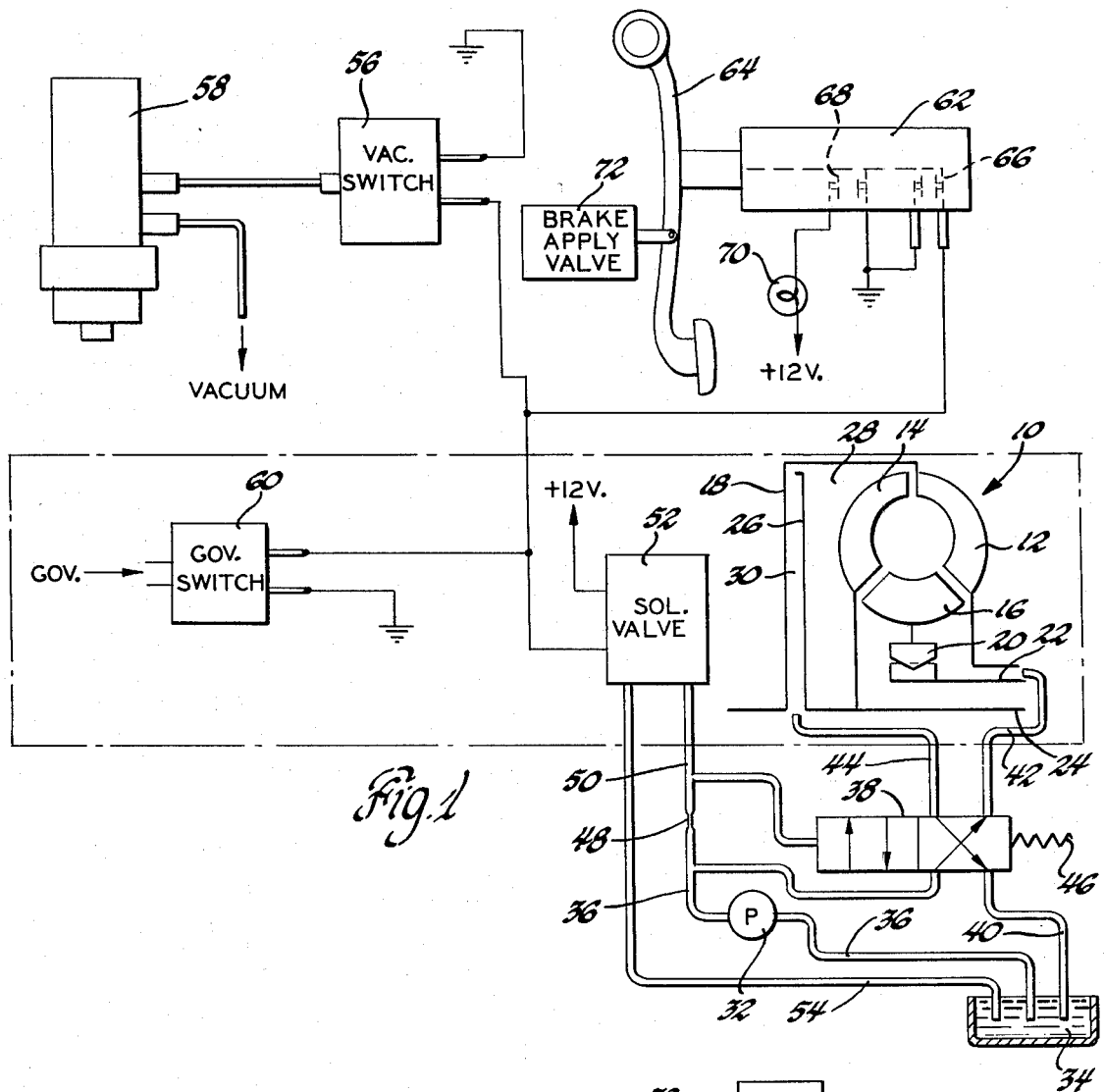
Figure 2:
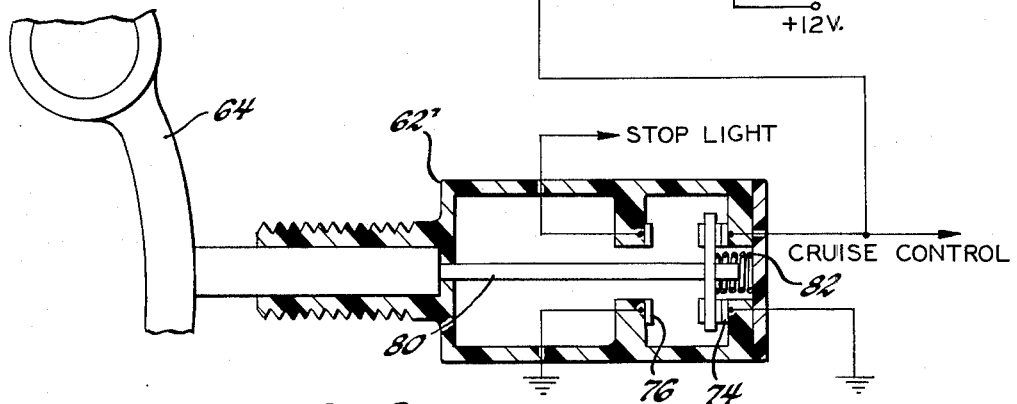

This and other objects and advantages of the present invention will be more apparent from the following description and drawings in which:

FIG. 1 is a diagrammatic representation of a torque converter clutch and control system; and FIG. 2 is a diagrammatic representation of a second embodiment of a portion of the control system.

Referring to the drawings and particularly to FIG. 1, there is seen a torque converter 10 having an impeller 12, a turbine 14 and a stator 16 disposed in conventional toroidal flow relationship to provide a fluid drive between the impeller 12 and the turbine 14. The impeller 12 is connected to an input shell 18 adapted to be driven by a vehicle engine, not shown. The stator 16 is connected through a conventional one-way device 20 which is grounded to the transmission housing, not shown, in a conventional manner through a sleeve shaft 22. The turbine 14 is drivingly connected to a transmission input shaft 24, which shaft 24 is also drivingly connected to a torque converter clutch 26.

The clutch 26 is operative to engage the input shell 18 thereby providing a direct drive connection between the input shell 18 and the transmission input shaft 24 thus bypassing the torque converter 10. It is well known that the use of a torque converter clutch to bypass the torque converter will improve the overall drive efficiency in a vehicle. The torque converter clutch 26 is engaged by fluid pressure in chamber 28 formed between the turbine 14 and the clutch 26, and is disengaged by fluid pressure in chamber 30, formed between the input shell 18 and the clutch 26. The torque converter 10 and clutch 26 may be constructed in accordance with the power transmitting mechanism shown in U.S. Pat. No. 3,252,352 to General et al issued May 24, 1966.

Fluid pressure for charging the torque converter and controlling the engagement and disengagement of clutch 26 is supplied by a conventional positive displacement hydraulic pump 32 which is preferably driven by the impeller 12 in a conventional manner. The pump 32 draws fluid from the transmission reservoir or sump 34 and delivers fluid through passage 36 to a control valve 38. Fluid discharged from the torque converter 10 is returned through a passage 40 to transmission sump 34. The valve 38 has two outlet passages 42 and 44 which are connected to the torque converter 10 and chamber 30, respectively. The valve 38 is positioned by a spring member 46 such that in the spring set position shown, fluid pressure from the pump is directed via passage 42 to the torque converter 10 and also to the chamber 28 to cause engagement of the clutch 26.

The fluid in passage 36 also passes through a restriction 48 to a passage 50 which is connected to a solenoid valve 52 and to the control valve 38. When the solenoid valve 52 is deenergized, fluid directed thereto is returned through passage 54 to the transmission sump 34 such that the fluid pressure in passage 50 is very low and is not sufficient to overcome the force in spring 46 so that the valve 38 will be in the position shown. However, if solenoid valve 52 is energized, the fluid pressure in passage 50 will increase to a level sufficient to cause valve 38 to move against spring 46 such that the passages 42 and 44 are interchanged through the valve 38 whereby the chamber 30 will be connected to passage 36 and the torque converter 10 will be connected to passage 40. In this situation, the clutch 26 will be disengaged.

The solenoid valve 52 must be energized under various operating conditions so that the clutch 26 will be engaged when the engine is operating at a level sufficient to accept a direct drive, bypassing the converter. The control system is designed to deenergize the solenoid valve when the engine is operating above a predetermined temperature and when the vehicle speed is above a predetermined value. A vacuum switch 56 is designed to open, thereby deenergizing the solenoid valve 52, when the engine temperature, as sensed by a conventional thermo vacuum valve 58, is above a predetermined value and the engine vacuum is in a predetermined range. When the engine vacuum is high, for example, at engine idle, the switch 56 is closed thereby completing an electrical circuit, between a +12-volt source and a ground connection, to energize the solenoid. At vacuum levels between idle and full throttle, the switch 56 is open. Preferably, the 12-volt source is a conventional vehicle battery. A governor switch 60 is opened above a predetermined vehicle speed. The governor switch 60 is actuated by a fluid pressure generated within the vehicle transmission by a conventional hydraulic governor. When the vehicle speed is below a predetermined value, for example, 30 mph, the governor switch 60 is closed thereby completing an electrical circuit between the 12-volt source and ground which is effective to energize the solenoid 52. As discussed above, when the solenoid valve 52 is energized, high pressure fluid is directed to chamber 30 to disengage the clutch 26. The switches 56 and 60 will be actuated when the engine vacuum is in the predetermined range and the vehicle speed is above the predetermined value to deenergize the solenoid 52, thus causing engagement of clutch 26.

It is desirable to disengage the clutch if the vehicle operator initiates acutation of the vehicle brakes. When, for example, the vehicle is operated on a very slippery surface, the actuation of the vehicle brakes can stop the driving wheels, while the vehicle slides, which would result in engine stall if the clutch 26 were engaged. To prevent this condition from occurring, an electrical switch 62 is operated by the vehicle brake pedal 64 to initiate clutch disengagement upon initial movement of the brake pedal 64 and prior to the actuation of the vehicle brakes. The electrical switch 62 has two pairs of electrical contacts 66 and 68 which are operative to control electrical circuits incorporating the solenoid valve 52 and the brake lights 70, respectively. The electrical contacts 66 are closed prior to the electrical contacts 68 being closed so that the solenoid 52 will be energized, thus initiating clutch disengagement prior to the brake lights 70 being energized.

As is well known, the contacts 68 are adjusted so that the brake lights 70 will be energized prior to or simultaneously with the actuation of the vehicle brake apply valve 72. Thus, the initiation of the disengagement of clutch 26 occurs prior to the actuation of the vehicle brakes. Even if the vehicle operator should move the brake pedal a slight amount not sufficient to actuate the vehicle brakes, the clutch 26 would be disengaged. It should be noted that the vacuum switch 56, governor switch 60 and electrical contacts 66 are connected in parallel such that the closing of any of these switches will cause energization of the solenoid 52.

There is seen in FIG. 2, a modified portion of the control system and in particular, the switch 62 has been modified and is designated 62'. The switch 62' includes a clutch control switch 74 and a brake light control switch 76. The clutch control switch 74 is effective to control a conventional electrical relay 78 which in turn controls the solenoid 52. A switch actuator rod 80 is controlled by the vehicle brake pedal 64 such that upon initial movement of the brake pedal 64, the rod 80 will be moved to the left by a spring 82 thereby opening the clutch control switch 74 prior to closing the brake light switch 76.

When the clutch control switch 74 is in the position shown, the relay 78 is operative to deenergize the solenoid 52 so that the clutch 26 will be engaged if the vacuum switch 56 and governor switch 60 are open. When the clutch control switch 74 is opened, the relay 78 is deenergized thereby completing an electrical circuit between solenoid 52 and ground so that the clutch 26 is disengaged prior to actuation of the vehicle brakes. The control system for the clutch 26 can also be designed so that the clutch is engaged when the solenoid is energized and disengaged when the solenoid is deenergized. This reversal of function will be obvious to those skilled in the art such that a schematic diagram is not considered necessary for the following description.

With this type of electrical system, the switch 62', shown in FIG. 2, would be connected in series with the governor switch 60 and vacuum switch 56. It should be appreciated that the switches 60 and 56 would also be reversed in function. With this electrical system, the relay 78 can be eliminated such that the solenoid 52 is operated directly by the clutch control switch 74 in response to initial movement of the brake pedal 64. The clutch control switch 74 can also be used to operate a conventional cruise control in a well known manner.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. In a vehicle having operator actuated vehicle brakes and a solenoid controlled torque converter clutch which is disengaged in response to a solenoid valve being energized, a vehicle brake actuator, a brake signal circuit, brake signal switch means actuated in response to movement of said vehicle brake actuator for energizing a brake signal circuit, and solenoid control switch means conditioned to normally deenergize the solenoid valve and being actuated by said vehicle brake actuator to energize the solenoid valve prior to brake signal switch actuation whereby disengagement of said torque converter clutch is initiated upon movement of said vehicle brake actuator prior to energization of the brake signal circuit.

2. In a vehicle having operator actuated vehicle brakes and a solenoid controlled torque converter clutch which is disengaged in response to a solenoid valve being energized, a vehicle brake actuator, brake energizing means actuated in response to movement of said vehicle brake actuator for energizing the vehicle brakes, and solenoid control switch means conditioned to normally deenergize the solenoid valve and being actuated by said vehicle brake actuator to energize the solenoid valve prior to energization of the vehicle brakes whereby disengagement of said torque converter clutch is initiated upon movement of said vehicle brake actuator prior to energization of the vehicle brakes.

3. In a vehicle having operator actuated vehicle brakes and a solenoid controlled torque converter clutch which is disengaged in response to solenoid valve means, a vehicle brake actuator, a brake signal circuit, brake signal switch means actuated in response to movement of said vehicle brake actuator for energizing the brake signal circuit, and solenoid control switch means normally conditioned to control the solenoid valve means to engage the torque converter clutch and being actuated by said vehicle brake actuator to control the solenoid valve means prior to brake signal switch actuation whereby disengagement of said torque converter clutch is initiated upon movement of said vehicle brake actuator prior to energization of the brake signal circuit.

4. In a vehicle having operator actuated vehicle brakes and a solenoid controlled torque converter clutch which is disengaged in response to solenoid valve means, a vehicle brake actuator, a brake actuating circuit, brake energizing means actuated in response to movement of said vehicle brake actuator for energizing the brake actuating circuit, and solenoid control switch means normally conditioned to control the solenoid valve means to engage the torque converter clutch and said solenoid control switch means being actuated by said vehicle brake actuator to operate the solenoid valve means prior to the brake actuating circuit being energized to effect disengagement of said torque converter clutch.

* * * * *